United States Patent [19]

Aoyama

[11] Patent Number: 5,616,430
[45] Date of Patent: Apr. 1, 1997

[54] REFORMER AND FUEL CELL SYSTEM USING THE SAME

[75] Inventor: Satoshi Aoyama, Susono, Japan

[73] Assignee: Toyota Jidosha Kabushiki Kaisha, Toyota, Japan

[21] Appl. No.: 518,402

[22] Filed: Aug. 15, 1995

[30] Foreign Application Priority Data

Aug. 30, 1994 [JP] Japan .................................. 6-230635

[51] Int. Cl.$^6$ .............................. H01M 8/04; H01M 8/18
[52] U.S. Cl. .................................. 429/17; 429/19; 429/20
[58] Field of Search .................................. 429/17, 19, 20

[56] References Cited

U.S. PATENT DOCUMENTS 4,751,151   6/1988   Healy et al. .............................. 429/17

FOREIGN PATENT DOCUMENTS

| 56-69775 | 6/1981 | Japan . |
| 63-13277 | 1/1988 | Japan . |
| 2-117071 | 5/1990 | Japan . |
| 4-206161 | 7/1992 | Japan . |
| 5-174854 | 7/1993 | Japan . |
| 5-217593 | 8/1993 | Japan . |
| 5-275101 | 10/1993 | Japan . |

OTHER PUBLICATIONS

Doi et al., "Fuel–Reforming Apparatuses For Phosphoric Acid Fuel Cells", Mitsubishi Denki Giho, 66(11), pp. 1055–1059 1992.

Artic Energies Ltd., "Evaluation of Laboratory Tests of the Internal Reformation of Desulfurized Diesel Fuel in an MCFC test Stack", Gov. Rep. Announce. Index (US), 93(21), Abstr. No. 364,500 1993.

*Primary Examiner*—Kathryn L. Gorgos
*Assistant Examiner*—Edna Wong
*Attorney, Agent, or Firm*—Oblon, Spivak, McClelland, Maier & Neustadt, P.C.

[57] ABSTRACT

While a fuel cell operates, a fuel cell system allows a carbon dioxide rich gas discharged from an anode of the fuel cell through consumption of hydrogen to be fed into a carbon dioxide recovery element of a carbon dioxide recovery unit. The carbon dioxide recovery element is packed with a zeolite, which absorbs and retains a polar substance $CO_2$. When the fuel cell stops operation, a recovery element heating burner receives a supply of the hydrogen-containing carbon dioxide rich gas fed via a first exhaust conduit of the fuel cell and a supply of methanol from a methanol reservoir, and combusts hydrogen contained in the carbon dioxide rich gas as well as the supply of methanol. This keeps the zeolite packed in the carbon dioxide recovery element under a heating condition, which allows carbon dioxide previously absorbed and retained to be released from the zeolite. A reforming reaction unit of a methanol reformer and the fuel cell are filled with the released carbon dioxide fed therein.

21 Claims, 6 Drawing Sheets

REFORMER AND FUEL CELL SYSTEM USING THE SAME

BACKGROUND OF THE INVENTION

1. Field of the Invention

The present invention relates to a reformer for reforming a supply of hydrocarbon to generate a hydrogen rich gas, and also to a fuel cell system with such a reformer.

2. Description of the Related Art

During non-operation of a fuel cell, the fuel cell and a reformer are kept in the environment different from that during operation of the fuel cell. In known fuel cell systems, the gaseous fuel remaining in the reformer and the fuel cell is replaced with an inert gas fed into the fuel cell system while the fuel cell stops operation. The replacement with an inert gas interferes with an unrequired progress of electrochemical reactions with the residual gaseous fuel and prevents generation of water in a cathode of the fuel cell, thereby preventing dew condensation in the electrodes or a pathway for gas flow and corrosion of electrodes by water. The replacement also prevents the fuel cell system including a reformer, a fuel cell, and a piping system from being affected by the negative pressure. For examples, the replacement protects an electrolyte membrane, such as a polymer electrolyte membrane, from damage by the negative pressure or prevents deterioration of the electrocatalytic ability by the air flown into the system.

A variety of methods including one with a tank of inert gas are applicable to replacement with an inert gas. A technique proposed and disclosed in JAPANESE PATENT LAYING-OPEN GAZETTE No. H2-117071 separates the air into oxygen and nitrogen and introduces the nitrogen to the fuel cell system.

The proposed technique does not require time-consuming replacement of a gas tank, but requires a specific mechanism for removal of oxygen from the air and a reservoir for storing gaseous nitrogen, thereby making the whole system rather bulky.

SUMMARY OF THE INVENTION

The object of the invention is thus to provide a reformer where an atmosphere can be easily replaced with an inert gas, and also to provide a space-saving fuel cell system with such a reformer.

The above and the other related objects are realized by a reformer including reformer means for reforming hydrocarbon to generate a hydrogen rich gas. The reformer includes:

gas feeding means for feeding a carbon dioxide-containing gas;

carbon dioxide absorption means for absorbing and retaining carbon dioxide in the carbon dioxide-containing gas under a predetermined first condition and releasing the absorbed and retained carbon dioxide under a predetermined second condition;

carbon dioxide release means for keeping the carbon dioxide absorption means under the predetermined second condition to make the absorbed and retained carbon dioxide released from the carbon dioxide absorption means; and replacement means for supplying the carbon dioxide released by the carbon dioxide release means to the reformer means to replace the hydrocarbon with the carbon dioxide.

In the reformer thus constructed, the gas feeding means feeds a carbon dioxide-containing gas to the carbon dioxide absorption means, which absorbs and retains carbon dioxide. The carbon dioxide release means keeps the carbon dioxide absorption means under the predetermined second condition to make the absorbed and retained carbon dioxide released from the carbon dioxide absorption means. The replacement means then supplies carbon dioxide released by the carbon dioxide release means to the reformer means for replacing a hydrocarbon with the carbon dioxide. In the structure of the invention, the single carbon dioxide absorption means efficiently absorbs and releases carbon dioxide to replace the hydrocarbon in the reformer means of the reformer with inert carbon dioxide. The replacement with carbon dioxide keeps the reformer means free from the environment of negative pressure and prevents the object of reforming, hydrocarbon and the result of reforming, hydrogen rich gas from remaining in the reformer means.

The reformer of the invention does not require separate means or devices for absorption and release of carbon dioxide (inert gas), which is used to replace the atmosphere in the reformer means, thereby favorably saving the required space.

The gas feeding means has gaseous hydrogen consumption means which consumes gaseous hydrogen included in the hydrogen rich gas generated by the reformer means and discharges a carbon dioxide rich gas and means for feeding the carbon dioxide rich gas discharged from the gaseous hydrogen consumption means to the carbon dioxide absorption means.

A typical example of the gaseous hydrogen consumption means is a fuel cell for consuming, as a gaseous fuel, gaseous hydrogen included in the hydrogen rich gas generated by the reformer means and discharging a carbon dioxide rich gas.

The reformer is favorably applied to the gaseous hydrogen consumption means, such as a fuel cell, which consumes gaseous hydrogen included in the hydrogen rich gas generated by the reformer means and discharges a carbon dioxide rich gas. The carbon dioxide rich gas is fed into the carbon dioxide absorption means. This structure enhances the $CO_2$-absorbing and retaining ability of the carbon dioxide absorption means.

The reformer of this structure having high $CO_2$-absorbing efficiency can absorb a required quantity of carbon dioxide within a short time, thereby attaining frequent replacement with carbon dioxide without any difficulty.

According to one preferable structure, the reformer means has gas generating means for receiving a supply of methanol or methane and reforming the supplied methanol or methane to generate a hydrogen rich gas.

According to another preferable structure, the carbon dioxide absorption means includes an absorption element packed with a zeolite for absorbing and retaining carbon dioxide, while the carbon dioxide release means has environment varying means for keeping the absorption element under a heating condition or a low pressure condition as the predetermined second condition.

Carbon dioxide absorbed and retained in zeolite is released by application of heat or through a decrease in pressure, and an atmosphere in the reformer means or the fuel cell is then replaced with inert carbon dioxide thus released.

It is preferable that the gas feeding means includes water content removal means for removing a water content in the carbon dioxide rich gas discharged from the fuel cell and feeding the water-removed to the carbon dioxide absorption means.

The removal of water content prevents water included in a gas from interfering with absorption of carbon dioxide and thus maintains the high $CO_2$-absorbing ability.

The invention is also directed to a fuel cell system including a reformer having reformer means for reforming hydrocarbon to generate a hydrogen rich gas, and a fuel cell for consuming, as a gaseous fuel, gaseous hydrogen included in the hydrogen rich gas generated by the reformer means of the reformer. The fuel cell system of the invention further includes:

gas feeding means for feeding a carbon dioxide rich gas discharged from said fuel cell;

absorption means packed with a carbon dioxide absorbent for absorbing and retaining carbon dioxide in the carbon dioxide rich gas at a predetermined first temperature and releasing the absorbed and retained carbon dioxide at a predetermined second temperature which is higher than the predetermined first temperature;

heating means for heating the absorption means at least to the predetermined second temperature at least during non-operation state of the fuel cell, thereby making carbon dioxide released from the carbon dioxide absorbent packed; and replacement means for supplying the carbon dioxide released from the absorption means to at least one of the reformer means to replace the hydrocarbon with the carbon dioxide and the fuel cell to replace the hydrogen rich gas with the carbon dioxide.

In the fuel cell system thus constructed, the gas feeding means feeds a carbon dioxide rich gas discharged from the fuel cell to the absorption means, which is packed with a carbon dioxide absorbent for absorbing and retaining carbon dioxide. The heating means heats the absorption means at least to the predetermined second temperature at least during non-operation condition of the fuel cell, thereby making carbon dioxide released from the carbon dioxide absorbent packed in the absorption means. The replacement means supplies carbon dioxide released from the absorption means to the reformer means for replacing the hydrocarbon with the carbon dioxide or to the fuel cell for replacing the hydrogen rich gas with the carbon dioxide. In the structure of the invention, the single absorption means including the carbon dioxide absorbent efficiently absorbs and releases carbon dioxide to replace the hydrocarbon in the reformer means of the reformer or the hydrogen rich gas in the fuel cell with inert carbon dioxide. The replacement with carbon dioxide keeps the reformer means and the fuel cell free from the environment of negative pressure. The $CO_2$ replacement also prevents the object of reforming, hydrocarbon and the result of reforming, hydrogen rich gas from remaining in the reformer means, while preventing the hydrogen rich gas used as a gaseous fuel from remaining in the fuel cell, thereby interfering with a progress of the electrochemical reactions.

The fuel cell system of the invention replaces the atmospheres in the reformer means and the fuel cell with inert carbon dioxide at least during non-operation of the fuel cell, thereby protecting the reformer means and the fuel cell from various troubles and problems. This structure has only one adsorption means packed with a carbon dioxide absorbent, which absorbs and retains carbon dioxide included in the carbon dioxide rich gas discharged from the fuel cell and releases the previously absorbed carbon dioxide according to the requirements. The fuel cell system of the invention does not require separate means or devices for absorption and release of inert carbon dioxide, thereby favorably saving the required space.

In the fuel cell system, the carbon dioxide rich gas discharged from the fuel cell is fed into the absorption means. This enhances the $CO_2$-absorbing and retaining ability of the carbon dioxide absorbent.

The absorption means having high $CO_2$-absorbing efficiency can absorb a required quantity of carbon dioxide within a short time. The fuel cell system absorbs and retains carbon dioxide during operation of the fuel cell, and releases the previously absorbed carbon dioxide for quick replacement of the hydrocarbon or the hydrogen rich gas with carbon dioxide during non-operation of the fuel cell. This structure is preferably applicable to cases where start and stop of operation of the fuel cell is repeated and the frequent replacement with carbon dioxide is required.

The fuel cell system of the invention can absorb and retain carbon dioxide required for replacement within the system without resupply from a gas tank. The fuel cell system, which is free from resupply of carbon dioxide, is accordingly applicable to various objects; for example, fixed plants like power plants as well as moving objects like vehicles.

In accordance with a preferable structure, the heating means includes combustion means for receiving a supply of the carbon dioxide rich gas containing residual hydrogen and discharged from the fuel cell and for combusting the residual hydrogen included in the carbon dioxide rich gas.

In this preferable structure, the heating means combusts the residual hydrogen in the carbon dioxide rich gas discharged from the fuel cell and applies heat to the absorption means to keep the temperature of the absorption means at or over the predetermined second temperature. As the fuel cell stops operation and replacement with carbon dioxide proceeds, the quantity of residual hydrogen included in the exhaust gas discharged from the fuel cell gradually decreases. This means that combustion of hydrogen by the heating means decreases with a progress of the replacement with carbon dioxide and spontaneously stops when there is no residual hydrogen in the exhaust gas. Release of carbon dioxide from the carbon dioxide absorbent by application of heat from the heating means is gradually suppressed with a progress of the replacement with carbon dioxide and eventually stops on completion of the replacement.

This effectively prevents carbon dioxide from being released from the carbon dioxide absorbent of the absorption means during non-operation of the fuel cell. The fuel cell system of this structure easily detects completion of replacement with carbon dioxide and does not require any additional equipment for supplying a combustion fuel to heat the carbon dioxide absorbent and allow release of carbon dioxide, thereby realizing a simple structure and reducing the required cost.

In another preferable structure, the heating means includes combustion means for receiving a supply of the hydrogen rich gas generated by the reformer means after a stop of supply of the hydrocarbon and for combusting hydrogen included in the hydrogen rich gas.

In the fuel cell system thus constructed, the heating means receives a supply of hydrogen rich gas having a high content of hydrogen from the reformer means, and heats the absorption means to or over the predetermined second temperature within a short time. This allows the atmospheres in the reformer means and the fuel cell to be quickly replaced with carbon dioxide.

A typical example of the carbon dioxide absorbent is a zeolite for absorbing and retaining carbon dioxide. Inert carbon dioxide absorbed and retained in the zeolite is released through application of heat and used for replacing the atmosphere in the reformer means of the reformer or the fuel cell.

According to one favorable structure, the replacement means supplies the carbon dioxide released from the absorption means to the reformer means and the fuel cell.

This allows the atmosphere in the reformer means of the reformer and the fuel cell to be replaced with inert carbon dioxide substantially simultaneously.

It is preferable that the fuel cell system further includes:

reformer heating means for combusting hydrogen to apply heat to the reformer means and adjust a reforming condition in the reformer; and gas introducing means for introducing the carbon dioxide rich gas containing residual hydrogen, which is discharged from the fuel cell and passes through the absorption means, to the reformer heating means, while the heating means is under a non-activating condition.

In the fuel cell system of this preferable structure, the carbon dioxide rich gas passing through the absorption means is fed to the reformer heating means while the heating means does not apply heat, that is, while the fuel cell operates. The reformer heating means combusts the residual hydrogen in the carbon dioxide rich gas to heat the reformer means and adjust the reforming condition. Hydrogen used as a fuel for adjusting the reforming condition can be supplied to some extent within the system.

According to one preferable structure, the gas feeding means has water content removal means for removing a water content in the carbon dioxide rich gas discharged from the fuel cell and feeding the water-removed gas to the absorption means.

The removal of water content prevents water included in a gas from interfering with absorption of carbon dioxide and thus maintains the high $CO_2$-absorbing ability.

The fuel cell applied to the invention is one selected among the group consisting of a Polymer Electrolyte Fuel Cell with a polymer electrolyte membrane, a Phosphoric Acid Fuel Cell with a phosphate electrolyte, and a Molten Carbonate Fuel Cell with an electrolyte plate impregnated with a molten carbonate.

It is further preferable that the fuel cell system includes:

replacement detecting means for detecting at least one of completion of replacement of the atmosphere in the reformer means and completion of replacement of the atmosphere in the fuel cell with the carbon dioxide supplied by the replacement means; and disconnecting means for, when the replacement detecting means detects completion of the replacement with carbon dioxide, blocking a pathway for discharging the carbon dioxide rich gas from the fuel cell.

The fuel cell system of this structure blocks the pathway for discharging the carbon dioxide rich gas when replacement of the atmosphere in the reformer means or the fuel cell with carbon dioxide is completed. This ensures replacement of the atmosphere in the reformer means or the fuel cell with carbon dioxide, and protects the reformer means or the fuel cell from the air flow, thereby preventing deterioration of the catalytic ability.

The replacement detecting means may have extinguished flame detecting means for detecting extinction of flame in the combustion means.

This structure informs the operator of completion of the replacement with carbon dioxide by detecting extinction of flame.

The invention is also directed to another fuel cell system including a reformer having reformer means for reforming hydrocarbon to generate a hydrogen rich gas, and a fuel cell for consuming, as a gaseous fuel, gaseous hydrogen included in the hydrogen rich gas generated by the reformer means of the reformer. The fuel cell system of the invention includes:

gas feeding means for feeding a carbon dioxide rich gas discharged from the fuel cell;

absorption means packed with a carbon dioxide absorbent for absorbing and retaining carbon dioxide in carbon dioxide rich gas at a predetermined first pressure and releasing the absorbed and retained carbon dioxide at a predetermined second pressure which is lower than the predetermined first pressure;

pressure reduction means for reducing pressure in the absorption means to at most the predetermined second pressure at least during non-operation state of the fuel cell, thereby making carbon dioxide released from the carbon dioxide absorbent packed in the absorption means; and replacement means for supplying the carbon dioxide released from the absorption means to at least one of the reformer means to replace the hydrocarbon with the carbon dioxide and the fuel cell to replace the hydrogen rich gas with the carbon dioxide.

In the fuel cell system thus constructed, the gas feeding means feeds a carbon dioxide rich gas discharged from the fuel cell to the absorption means, which is packed with a carbon dioxide absorbent for absorbing and retaining carbon dioxide. The pressure reduction means reduces pressure in the absorption means to at most the predetermined second pressure at least during non-operation state of the fuel cell, thereby making carbon dioxide released from the carbon dioxide absorbent packed in the absorption means. The replacement means supplies carbon dioxide released from the absorption means to the reformer means for replacing the hydrocarbon with the carbon dioxide or to the fuel cell for replacing the hydrogen rich gas with the carbon dioxide. In the structure of the invention, the single absorption means including the carbon dioxide absorbent efficiently absorbs and releases carbon dioxide to replace the hydrocarbon in the reformer means of the reformer or the hydrogen rich gas in the fuel cell with inert carbon dioxide. The fuel cell system of the invention does not require separate means or devices for absorption and release of inert carbon dioxide, thereby favorably saving the required space.

In the fuel cell system, the carbon dioxide rich gas discharged from the fuel cell is fed into the absorption means. This enhances the $CO_2$-absorbing and retaining ability of the carbon dioxide absorbent. The absorption means having high $CO_2$-absorbing efficiency can absorb a required quantity of carbon dioxide within a short time. The fuel cell system absorbs and retains carbon dioxide during operation of the fuel cell, and releases the previously absorbed carbon dioxide for quick replacement of the hydrocarbon or the hydrogen rich gas with carbon dioxide during non-operation of the fuel cell. This structure is preferably applicable to cases where start and stop of operation of the fuel cell is repeated and the frequent replacement with carbon dioxide is required.

The fuel cell system of the invention can absorb and retain carbon dioxide required for replacement within the system without resupply from a gas tank. The fuel cell system, which is free from resupply of carbon dioxide, is accordingly applicable to various objects; for example, fixed plants like power plants as well as moving objects like vehicles.

In this structure, a typical example of the carbon dioxide absorbent of the absorption means is also a zeolite for absorbing and retaining carbon dioxide. Inert carbon dioxide absorbed and retained in the zeolite is released by reducing the pressure and used for replacing the atmosphere in the reformer means of the reformer or the fuel cell.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
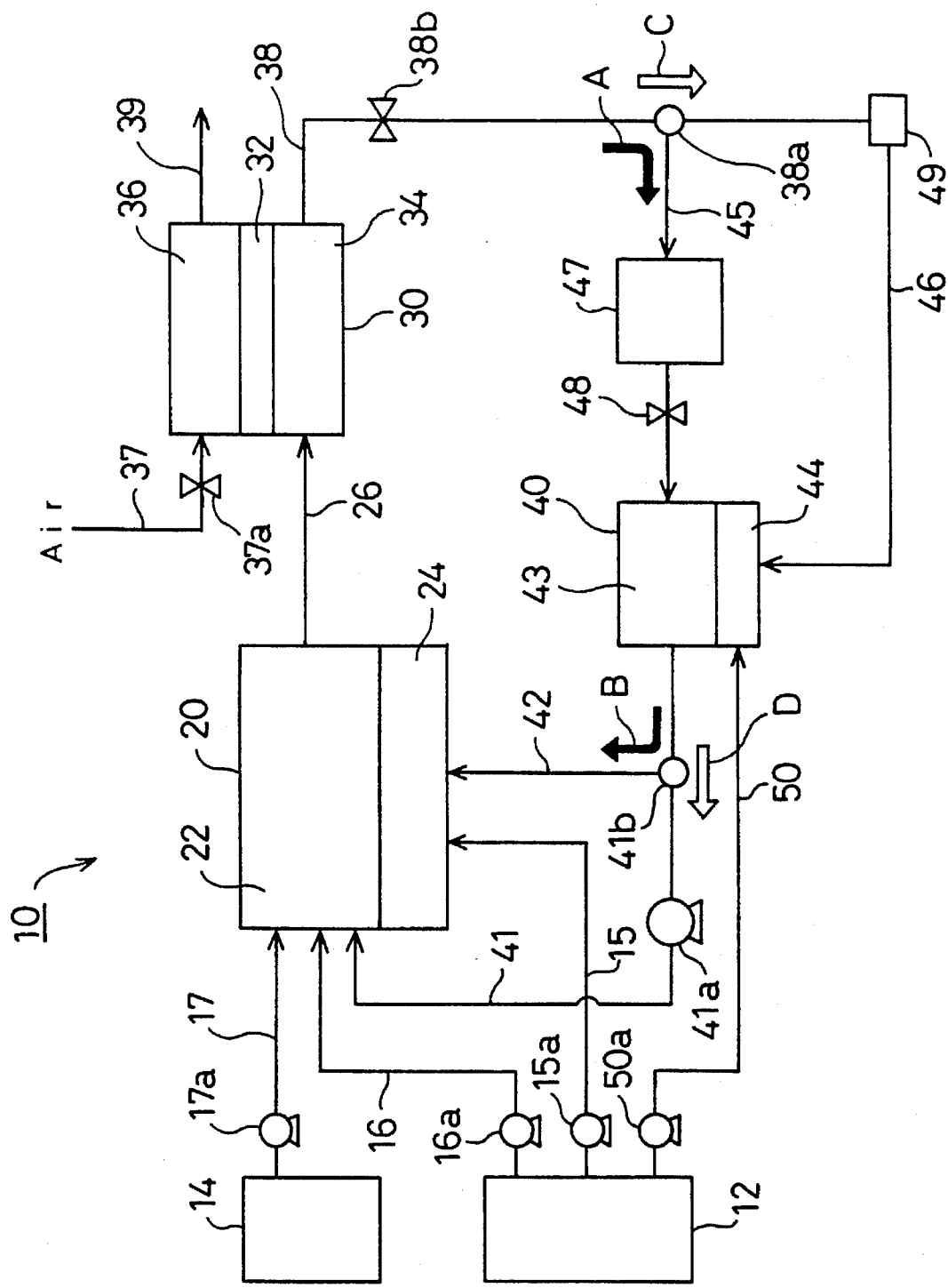
FIG. 1 is a block diagram schematically illustrating structure of a fuel cell system 10 as a first embodiment according to the invention.

Fuel cell systems embodying the invention are described according to the drawings. FIG. 1 is a block diagram schematically illustrating structure of a fuel cell system 10 as a first embodiment according to the invention.

The fuel cell system 10 includes a methanol reservoir 12 for storing methanol as an object of reforming, a water reservoir 14 for storing water applied to the process of reforming methanol, a methanol reformer 20 for receiving supplies of methanol and water respectively fed from the methanol reservoir 12 and the water reservoir 14, and a fuel cell 30 to which gaseous hydrogen is fed as a gaseous fuel for an anode.

The methanol reformer 20 further includes a reforming reaction unit 22 for making methanol react with water in the presence of a catalyst to steam-reform the methanol, and a reaction unit heating burner 24 for heating the reforming reaction unit 22 to maintain the temperature in the reforming reaction unit 22 in a range of 250° through 300° C. which allows the catalyst to sufficiently perform its catalytic actions. Methanol is fed from the methanol reservoir 12 via a first methanol supply conduit 15 to the reaction unit heating burner 24 by means of a first pressure pump 15a arranged in the first methanol supply conduit 15. The reaction unit heating burner 24 also receives a supply of gaseous hydrogen fed from a carbon dioxide recovery unit 40 (described later) via a branched pipe 42 to which a gas substitution conduit 41 branches off. The reaction unit heating burner 24 combusts the supplies of methanol and gaseous hydrogen at respective burner units to maintain the temperature in the reforming reaction unit 22 in the range specified as above at least during operation of the fuel cell 30. Supply of gaseous hydrogen from the carbon dioxide recovery unit 40 will be described in detail later.

The reforming reaction unit 22 receives a supply of methanol, which is an object of reforming, fed from the methanol reservoir 12 via a second methanol supply conduit 16 by means of a second pressure pump 16a arranged in the second methanol supply conduit 16. The reforming reaction unit 22 also receives a supply of water fed from the water reservoir 14 via a water supply conduit 17 by means of a pressure pump 17a arranged in the water supply conduit 17. The reforming reaction unit 22 makes the reforming reaction of methanol with water proceed in the presence of a catalyst to steam-reform the methanol and generate a hydrogen rich gas ($H_2$: 75%, $CO_2$: 25%) mixed with water vapor. The hydrogen rich gas thus generated is fed to the fuel cell 30 via a gaseous hydrogen supply conduit 26.

The gas substitution conduit 41 also connects the carbon dioxide recovery unit 40 to the reforming reaction unit 22. The reforming reaction unit 22 receives carbon dioxide ($CO_2$) fed from the carbon dioxide recovery unit 40 via the gas substitution conduit 41 by means of a gas pump 41a arranged in the gas substitution conduit 41. Introduction of carbon dioxide from the carbon dioxide recovery unit 40 will be described in detail later.

The fuel cell 30 includes an anode 34, a cathode 36, and an electrolyte membrane 32 interposed between the anode 34 and the cathode 36. The hydrogen rich gas generated in the methanol reformer 20 is fed as a gaseous fuel to the anode 34 via the gaseous hydrogen supply conduit 26, whereas oxygen in the air is supplied to the cathode 36 through an air supply conduit 37 by means of a compressor (not shown) and a valve 37a arranged in the air supply conduit 37. The fuel cell 30 allows known electrochemical reactions to proceed both on the anode and the cathode to generate an electromotive force, which is used to drive and operate an external device, for example, a motor in electric vehicles. A typical example of the fuel cell 30 is a Polymer Electrolyte Fuel Cell having a polymer electrolyte membrane as the electrolyte membrane 32.

During operation of the fuel cell 30, gaseous hydrogen included in the supply of hydrogen rich gas is consumed by the electrochemical reaction proceeding on the anode 34, while oxygen in the supplied air is consumed by the electrochemical reaction on the cathode 36. Non-reacted (non-consumed), residual hydrogen as well as carbon dioxide not involved in the electrochemical reaction is discharged from the anode 34 through a first exhaust conduit 38. Since hydrogen is partly consumed by the electrochemical reaction on the anode 34, discharged through the first exhaust conduit 38 is a carbon dioxide rich gas containing hydrogen. Non-reacted (non-consumed), residual oxygen as well as nitrogen in the air not involved in the electrochemical reaction is discharged from the cathode 36 through a second exhaust conduit 39 to the atmosphere.

The fuel cell system 10 is provided with the carbon dioxide recovery unit 40, which replaces atmospheres of residual fuel gas in the reforming reaction unit 22 of the methanol reformer 20 and the fuel cell 30 (specifically, the anode 34) with carbon dioxide.

The carbon dioxide recovery unit 40 includes a carbon dioxide recovery element 43 packed with a zeolite and a recovery element heating burner 44 for heating the carbon dioxide recovery element 43 to apply heat to the zeolite. The zeolite used here for preferentially absorbing and retaining a polar substance $CO_2$ may be, for example, a synthetic zeolite manufactured by Union Carbide Corp. and sold under the trade name of Molecular Sieves. The carbon dioxide recovery element 43 connects with a first branched exhaust pipe 45, to which the first exhaust conduit 38 starting from the anode 34 branches off at a first three-way valve 38a. The recovery element heating burner 44 connects with a second branched exhaust pipe 46 of the first exhaust conduit 38. When the first three-way valve 38a is switched to allow the passage to the first branched exhaust pipe 45 while an exhaust valve 38b arranged before the first three-way valve 38a is open to allow the flow of exhaust gas, the carbon dioxide rich gas discharged from the fuel cell 30 is fed into the carbon dioxide recovery element 43 via the first branched exhaust pipe 45. When the first three-way valve 38a is switched to allow the passage to the second branched exhaust pipe 46, on the other hand, the carbon dioxide rich gas is fed into the recovery element heating burner 44 via the second branched exhaust pipe 46. Details of the switching operation of the first three-way valve 38a will be described later.

As shown in FIG. 1, the first branched exhaust pipe 45 is provided with a condenser 47 for condensing water vapor in the gas for removal of water content and a valve 48 to allow or block the flow of exhaust gas. This structure allows the carbon dioxide rich gas after the removal of the water content to be fed into the carbon dioxide recovery element 43. A hydrogen sensor 49 disposed in the second branched exhaust pipe 46 detects the concentration of hydrogen included in the gas.

As described previously, the gas substitution conduit 41 connects the carbon dioxide recovery element 43 to the reforming reaction unit 22 of the methanol reformer 20 and branches off to the branched pipe 42 at a second three-way valve 41b, which connects with the reaction unit heating burner 24. Gas from the carbon dioxide recovery unit 40 is fed to either the reforming reaction unit 22 or the reaction unit heating burner 24 of the methanol reformer 20 through the switching operation of the second three-way valve 41b. Details of the switching operation of the second three-way valve 41b will be described later.

Figure 2:
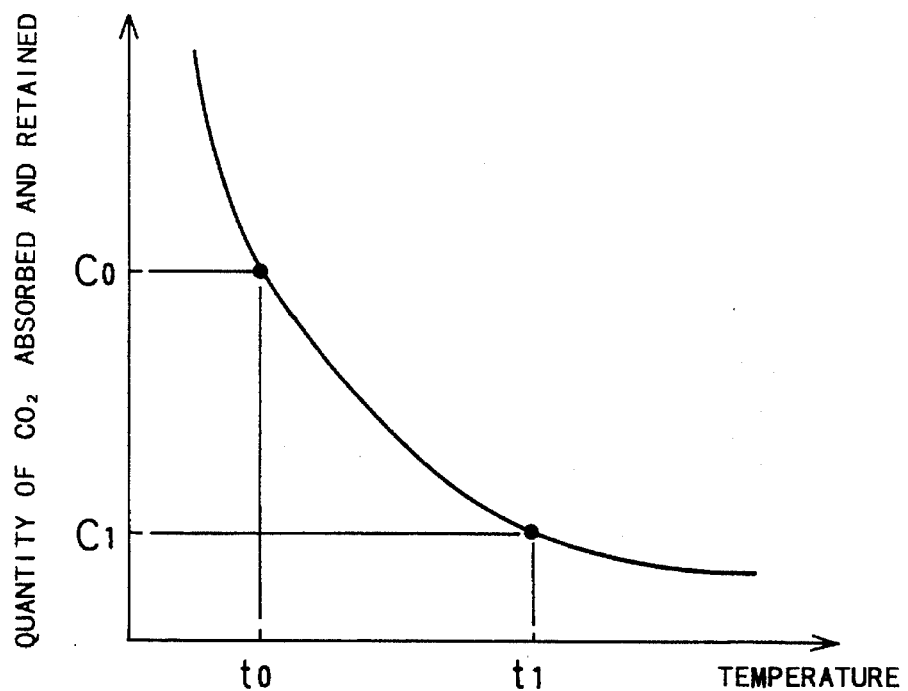
FIG. 2 is a graph, where the $CO_2$-absorbing and retaining ability of zeolite charged in the carbon dioxide recovery unit 43 is plotted against the temperature.

The zeolite packed in the carbon dioxide recovery element 43 has ability to absorb and retain $CO_2$. The quantity of $CO_2$ absorbed and retained in the zeolite (saturated quantity) decreases with an increase in temperature as clearly seen in the graph of FIG. 2. When the zeolite is heated over a temperature at which the zeolite absorbs and retains carbon dioxide, carbon dioxide absorbed and retained is released from the zeolite. In a concrete example, the zeolite absorbs and retains a specific quantity C0 of carbon dioxide at a first temperature t0. When the zeolite is heated to a second temperature t1, which is higher than the first temperature t0, carbon dioxide is released from the zeolite by a quantity of (C1–C0).

This structure allows the carbon dioxide recovery element 43 to fill the gas substitution conduit 41 with either carbon dioxide or gaseous hydrogen (hydrogen rich gas), which is residue of the carbon dioxide rich gas fed into the carbon dioxide recovery element 43 after the release of carbon dioxide. After the zeolite packed in the carbon dioxide recovery element 43 absorbs and retains the saturated quantity of $CO_2$, the carbon dioxide rich gas containing hydrogen passes through the carbon dioxide recovery element 43 to the gas substitution conduit 41.

The recovery element heating burner 44 includes a hydrogen burner unit for combusting hydrogen and a methanol burner unit for combusting methanol. The hydrogen burner unit receives the carbon dioxide rich gas fed through the second branched exhaust pipe 46, whereas the methanol burner unit receives a supply of methanol fed from the methanol reservoir 12 via a third methanol supply conduit 50 by means of a third pressure pump 50a disposed in the third methanol supply conduit 50. The recovery element heating burner 44 combusts the residual gaseous hydrogen included in the carbon dioxide rich gas as well as the supply of methanol from the methanol reservoir 12 to keep the zeolite packed in the carbon dioxide recovery element 43 under the heating condition at least while the fuel cell 30 stops operation. The heating procedure of the carbon dioxide recovery element 43 by the recovery element heating burner 44 will be described in detail later.

The fuel cell system 10 thus constructed works in the following manner with operation of the fuel cell 30.

During operation of the fuel cell 30, a control device (not shown) drives and controls the first pressure pump 15a, the second pressure pump 16a, and the pressure pump 17a connecting with the methanol reformer 20. This ensures supplies of methanol and water to the reforming reaction unit 22 and a supply of methanol to the reaction unit heating burner 24. The methanol reformer 20 steam-reforms the supply of methanol to generate a hydrogen rich gas, which is fed to the anode 34 of the fuel cell 30.

The control device drives and controls on the valve 37a in the air supply conduit 37 and the exhaust valve 38b in the first exhaust conduit 38 to connect with the fuel cell 30, as well as the valve 48 in the first branched exhaust pipe 45 to connect with the carbon dioxide recovery unit 40. The control device also switches the first three-way valve 38a in the first exhaust conduit 38 to allow the passage to the first branched exhaust pipe 45, as well as the second three-way valve 41b in the gas substitution conduit 41 to allow the passage to the branched pipe 42. This valve operation allows continuous supply of hydrogen rich gas to the anode 34 of the fuel cell 30 and that of oxygen in the air to the cathode 36. The fuel cell 30 generates an electromotive force through the electrochemical reactions of the gaseous fuel and oxygen and discharges the carbon dioxide rich gas via the first exhaust conduit 38.

The carbon dioxide rich gas thus discharged is flown through the first branched exhaust pipe 45 via the first three-way valve 38a as shown by the closed arrow A in FIG. 1, and is fed into the carbon dioxide recovery element 43 of the carbon dioxide recovery unit 40 after removal of the water content by the condenser 47. Carbon dioxide is absorbed and retained in the zeolite packed in the carbon dioxide recovery element 43.

Since the carbon dioxide rich gas is fed into the carbon dioxide recovery element 43, absorption and retention of carbon dioxide in the zeolite is completed at the early stage of the gas introducing procedure.

Either the residual hydrogen rich gas or the hydrogen-containing carbon dioxide rich gas is fed from the carbon dioxide recovery element 43 via the second three-way valve 41b of the gas substitution conduit 41 and the branched pipe 42 to the reaction unit heating burner 24 as shown by the closed arrow B in FIG. 1. During operation of the fuel cell 30, hydrogen-containing gas is fed through the branched pipe 42 to the reaction unit heating burner 24, where gaseous hydrogen in the gas is used as a fuel for heating the reforming reaction unit 22.

When operation of the fuel cell 30 stops, the control device drives and controls the pumps and valves in the following manner. In an electric vehicle having the fuel cell system 10 mounted thereon, for example, when ignition key is turned off to stop operation of the fuel cell 30, the control device receives the OFF signal to drive and control the devices concerned.

The control device stops the first pressure pump 15a, the second pressure pump 16a, and the pressure pump 17a connecting with the methanol reformer 20. The reforming reaction unit 22 continues the steam-reforming as long as methanol and water exist, but eventually stops the steam-reforming after suppression of methanol supply. The reaction unit heating burner 24 stops heating the reforming reaction unit 22.

The control device controls off the valve 37a and the valve 48 to cut the connection with the fuel cell 30 and the carbon dioxide recovery unit 40, and switches the first three-way valve 38a to allow the passage to the second branched exhaust pipe 46 and the second three-way valve 41b to allow the passage to the downstream portion of the gas substitution conduit 41. During non-operation of the fuel cell 30, the control device further drives and controls the third pressure pump 50a of the third methanol supply conduit 50 and the gas pump 41a of the gas substitution conduit 41. This suppresses supply of oxygen to stop operation of the fuel cell 30.

Even after the fuel cell 30 stops operation, a hydrogen rich gas generated from the residual methanol in the methanol reformer 20 is fed to the fuel cell 30 for a while. Carbon dioxide rich gas is discharged from the first exhaust conduit 38 immediately after a stop of operation of the fuel cell 30, and is gradually replaced by the hydrogen rich gas which passes through the fuel cell 30 without being consumed by the electrochemical reaction on the anode 34. The exhaust gas from the first exhaust conduit 38 is fed into the recovery element heating burner 44 of the carbon dioxide recovery unit 40 via the first three-way valve 38a and the second branched exhaust pipe 46 as shown by the open arrow C in FIG. 1.

While the fuel cell 30 stops operation, the recovery element heating burner 44 receives the exhaust gas fed through the first exhaust conduit 38 as well as a supply of methanol from the methanol reservoir 12. The carbon dioxide recovery element 43 is heated for the first time by the recovery element heating burner 44 when the fuel cell 30 ceases operation. The zeolite packed in the carbon dioxide recovery element 43 is thus kept under the heating condition, and carbon dioxide absorbed and retained is released from the zeolite. Carbon dioxide thus released passes through the second three-way valve 41b and the gas substitution conduit 41 and is fed into the reforming reaction unit 22 of the methanol reformer 20 as shown by the open arrow D in FIG. 1. Carbon dioxide is forcibly fed into the reforming reaction unit 22 by means of the gas pump 41a. The valve 48 is controlled off to cut the connection with the first branched exhaust pipe 45, and carbon dioxide released from the zeolite is thus totally flown into the gas substitution conduit 41.

Under such conditions, supplies of methanol and water to the reforming reaction unit 22 have already been suppressed. Introduction of carbon dioxide from the carbon dioxide recovery element 43 to the reforming reaction unit 22 replaces an atmosphere of residual fuel gas in the reforming reaction unit 22 with the carbon dioxide. After completion of the replacement of the residual fuel gas in the reforming reaction unit 22 with carbon dioxide, the excess carbon dioxide is fed into the anode 34 of the fuel cell 30 via the gaseous hydrogen supply conduit 26. This completes replacement of an atmosphere in the fuel cell 30 with carbon dioxide.

In the fuel cell system 10 of the first embodiment, the quantity of zeolite packed in the carbon dioxide recovery element 43 and the heating temperature by the recovery element heating burner 44 are determined to completely replace atmospheres of residual fuel gas in the reforming reaction unit 22 and the fuel cell 30 with carbon dioxide.

After completion of replacement of the residual fuel gas in the reforming reaction unit 22 and the fuel cell 30 with carbon dioxide, the third pressure pump 50a and the gas pump 41a are inactivated to stop supply of methanol to the recovery element heating burner 44. This stops application of heat to the carbon dioxide recovery element 43 by the methanol burner unit of the recovery element heating burner 44. The first exhaust conduit 38 is also filled with carbon dioxide from the fuel cell 30, and the hydrogen-containing gas is accordingly not fed to the recovery element heating burner 44. This extinguishes a flame in the hydrogen burner unit of the recovery element heating burner 44.

After completion of replacement with carbon dioxide, the exhaust valve 38b is controlled off to block the passage. The shut-off operation of the exhaust valve 38b completely closes all the conduits and pipes in the fuel cell system 10 and allows the reforming reaction unit 22 and the fuel cell 30 to be kept in the atmosphere of carbon dioxide until resumed operation of the fuel cell system 10. Like the known system of replacing the residual fuel gas with nitrogen, the fuel cell system 10 of the embodiment, which replaces the residual fuel gas with carbon dioxide, effectively prevents various troubles and problems including corrosion of electrodes by the water content, damage of the polymer electrolyte membrane by the negative pressure, and deterioration of the catalytic performance by the air.

One of the methods mentioned below is used to determine completion of replacement of atmospheres in the reforming reaction unit 22 and the fuel cell with carbon dioxide. The first method determines completion of the replacement with carbon dioxide by extinction of flame of the hydrogen burner unit of the recovery element heating burner 44. A time period between a start of the replacement with carbon dioxide and extinction of flame is previously calculated from the volume of the reforming reaction unit 22, the volume of the flow path, and the quantity of carbon dioxide absorbed and retained in the carbon dioxide recovery element 43. Elapse of the calculated time period is taken as completion of the replacement with carbon dioxide. Alternatively extinction of flame may be actually detected with a sensor like a thermocouple or a photo-coupler. The second method monitors the hydrogen sensor 49 disposed in the second branched exhaust pipe 46 and determines completion of the replacement with carbon dioxide when the detected concentration of gaseous hydrogen decreases to or below a predetermined level. This method is based on the fact that the atmosphere in the first exhaust conduit 38 is also replaced with carbon dioxide. The first method does not require any specific sensor for determining completion of the replacement with carbon dioxide, thereby simplifying the structure and reducing the cost.

On resumed operation of the fuel cell 30, the fuel cell system 10 works in the above manner. The zeolite packed in the carbon dioxide recovery element 43 is naturally cooled while the fuel cell 30 stops operation. This makes it possible for the carbon dioxide recovery element 43 to start absorption and retention of carbon dioxide without delay. Even when operation of the fuel cell 30 is resumed after a short stop, which is insufficient for natural cooling of zeolite, the zeolite is forcibly cooled by the exhaust gas of the fuel cell 30 initially fed therein. This case also ensures sufficient absorption and retention of carbon dioxide.

As described above, the fuel cell system 10 of the first embodiment replaces atmospheres of residual fuel gas in the reforming reaction unit 22 and the fuel cell 30 with carbon dioxide and effectively prevents various troubles and problems. This system only requires the carbon dioxide recovery unit 40 for absorption and release of inert carbon dioxide, which saves the required space for the whole system.

Carbon dioxide rich gas discharged from the anode 34 of the fuel cell 30 is fed to the carbon dioxide recovery element 43, when carbon dioxide is absorbed to the zeolite in the carbon dioxide recovery element 43. This structure improves the efficiency of absorption and allows a required quantity of carbon dioxide to be absorbed into the zeolite within a relatively short time. When the fuel cell 30 stops operation, carbon dioxide absorbed in the zeolite is released without delay to replace the atmosphere of residual fuel gas. The fuel cell system 10 of the first embodiment allows absorption and retention of carbon dioxide with a high efficiency and easily replaces the atmosphere of residual fuel gas in the reforming reaction unit 22 and the fuel cell 30 with released carbon dioxide. This structure is preferably applied to cases in which stop and restart of operation of the fuel cell 30 is frequently repeated and the replacement with carbon dioxide is required at frequent intervals.

The fuel cell system 10 retains carbon dioxide absorbed therein and thus does not require resupply of carbon dioxide from an external tank. Electric vehicles with the fuel cell system 10 mounted thereon are accordingly free from troublesome resupply of inert gas from an external tank.

In the fuel cell system 10 of the embodiment, the zeolite packed in the carbon dioxide recovery element 43 and heated for release of carbon dioxide is cooled naturally during non-operation of the fuel cell 30 and then forcibly by the exhaust gas of the fuel cell 30 on resumed operation of the fuel cell 30. The fuel cell system 10 of the first embodiment does not require any special cooling mechanism for restoring the $CO_2$-absorbing and retaining ability of zeolite, thereby realizing the simplified structure.

In the fuel cell system 10, the recovery element heating burner 44 keeps the zeolite in the carbon dioxide recovery element 43 under the heating condition for the release of carbon dioxide, through combustion of residual hydrogen in the exhaust gas of the fuel cell 30 and combustion of methanol fed from the methanol reservoir 12. This structure allows quick application of heat to the zeolite, thereby completing replacement of atmospheres in the reforming reaction unit 22 and the fuel cell 30 with carbon dioxide within a short time.

Figure 3:
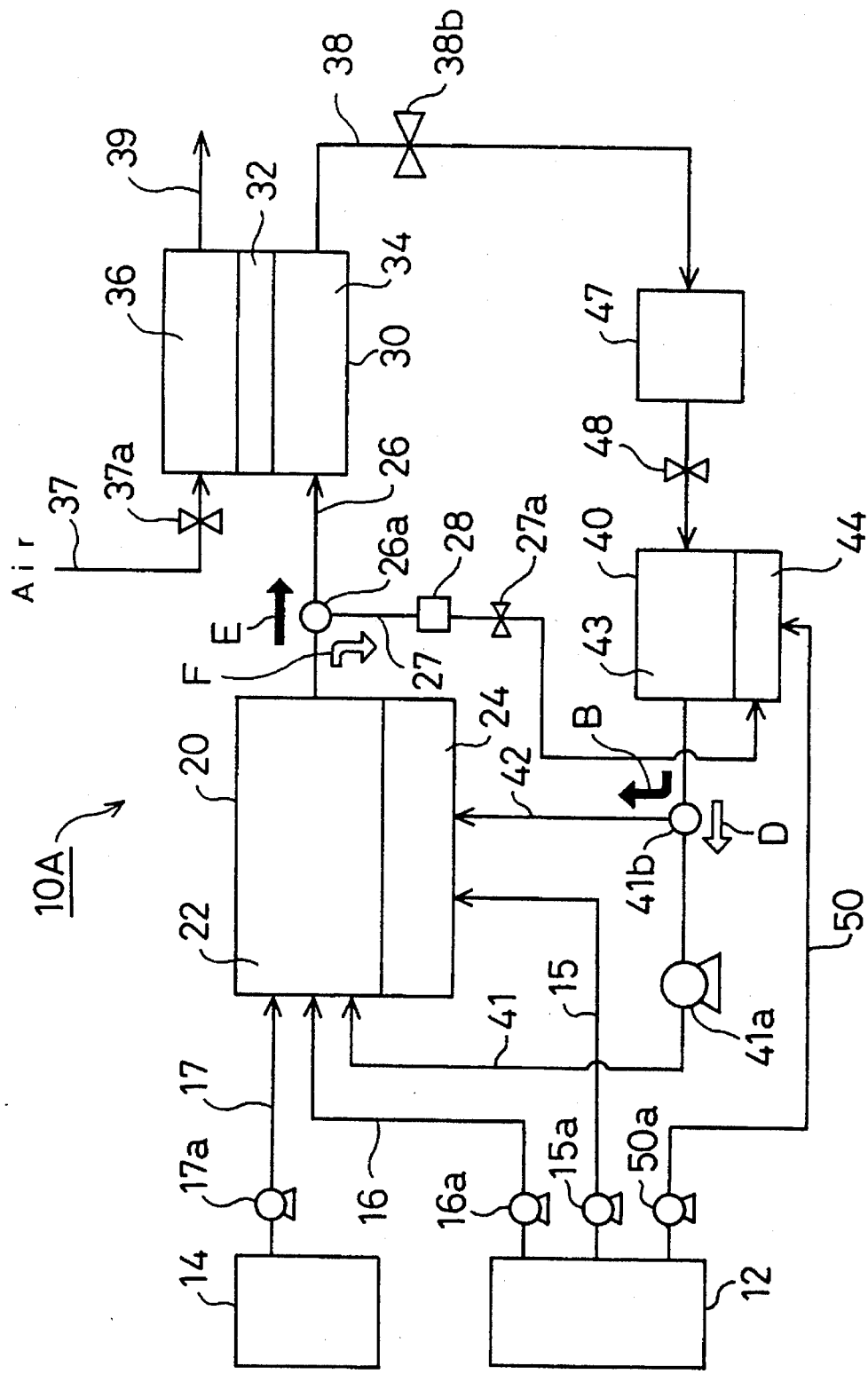
FIG. 3 is a block diagram schematically illustrating structure of a fuel cell system 10A as a second embodiment according to the invention.

FIG. 3 is a block diagram schematically illustrating structure of a fuel cell system 10A as a second embodiment according to the invention. The fuel cell system 10A has similar structure to that of the fuel cell system 10 of the first embodiment, except a pathway of introducing hydrogen to the hydrogen burner unit of the recovery element heating burner 44 and a structure for stopping the methanol reformer 20 and the fuel cell 30. The following description concentrates on the difference in structure. In the description below, like numerals denote like elements as above.

As shown in FIG. 3, the fuel cell system 10A includes a three-way valve 26a in the gaseous hydrogen supply conduit 26, which connects the methanol reformer 20 with the fuel cell 30. The recovery element heating burner 44 of the carbon dioxide recovery unit 40 receives a supply of hydrogen rich gas fed through a branched gaseous hydrogen pipe 27, to which the gaseous hydrogen supply conduit 26 branches off, and allows combustion of gaseous hydrogen included in the hydrogen rich gas by its hydrogen burner unit. The branched gaseous hydrogen pipe 27 is provided with a hydrogen sensor 28 for detecting the concentration of hydrogen in the gas and a valve 27a to allow and block the flow of hydrogen rich gas.

The fuel cell system 10A of the second embodiment works in the following manner. While the fuel cell 30 operates, a control device (not shown) switches the three-way valve 26a disposed in the gaseous hydrogen supply conduit 26 to allow the passage to the fuel cell 30. The hydrogen rich gas generated in the methanol reformer 20 is accordingly supplied to the fuel cell 30 as shown by the closed arrow E in FIG. 3. Except the control of the three-way valve 26a, the fuel cell system 10A is driven and controlled in a manner similar to that of the fuel cell system 10 of the first embodiment. Namely the carbon dioxide recovery unit 40 allows carbon dioxide included in the carbon dioxide rich gas discharged from the fuel cell 30 to be absorbed and retained into a zeolite packed in the carbon dioxide recovery element 43, during operation of the fuel cell 30.

When an instruction is given to stop operation of the fuel cell 30, the pumps and valves are driven and controlled in the following manner to stop operation of the methanol reformer 20 and the fuel cell 30.

Like the first embodiment, the control device stops the first pressure pump 15a, the second pressure pump 16a, and the pressure pump 17a connecting with the methanol reformer 20. In the fuel cell system 10A of the second embodiment, the control device further switches the three-way valve 26a to allow the passage to the branched gaseous hydrogen pipe 27, simultaneously with the stopping operation of these pumps. This stops steam-reforming of methanol in the methanol reformer 20 as well as heating operation in the reaction unit heating burner 24. A hydrogen rich gas generated through the reaction of the residual methanol with the residual water in the reforming reaction unit 22 is fed via the branched gaseous hydrogen pipe 27 to the hydrogen burner unit of the recovery element heating burner 44 as shown by the open arrow F in FIG. 3. In the meanwhile, a supply of methanol is fed to the methanol burner unit of the recovery element heating burner 44 for combustion by means of the third pressure pump 50a. Like the first embodiment, in the fuel cell system 10A of the second embodiment, the recovery element heating burner 44 applies heat to the zeolite in the carbon dioxide recovery element 43 to make absorbed and retained carbon dioxide released from the zeolite.

The control device controls off the exhaust valve 38b of the first exhaust conduit 38 and the valve 48 to cut the connection with the fuel cell 30 and the carbon dioxide recovery unit 40, while keeping the valve 37a open to maintain the connection with the air supply conduit 37. The fuel cell 30 continues electrochemical reactions as long as the hydrogen rich gas remains in the branched gaseous hydrogen pipe 27 and the anode 34 arranged after the three-way valve 26a. The fuel cell 30 eventually stops operation when all the hydrogen content in the hydrogen rich gas is consumed by the electrochemical reactions. Since the exhaust valve 38b is closed at this stage, only carbon dioxide remains in the pathway from the three-way valve 26a via the fuel cell 30 to the exhaust valve 38b, after the consumption of hydrogen. There is only a little space between the three-way valve 26a and the exhaust valve 38b, the remaining carbon dioxide after the consumption of hydrogen accordingly gives only a small negative pressure and does not cause a damage of the electrode membrane 32, which is often observed under the condition of excessive negative pressure. According to a preferable structure, the gaseous hydrogen supply conduit 26 may also be provided with a fine tube by-passing the three-way valve 26a. This structure allows the hydrogen rich gas generated through the reaction of the residual methanol with the residual water in the reforming reaction unit 22 to be sucked little by little to the fuel cell 30 via the by-pass tube. Excess carbon dioxide not used for replacement of the atmosphere in the reforming reaction unit 22 is also sucked to the fuel cell 30. This structure effectively prevents the negative pressure.

In the fuel cell system 10A, the gas pump 41a of the gas substitution conduit 41 is driven and controlled in the same manner as the first embodiment, when the fuel cell 30 stops operation. Carbon dioxide released from the zeolite in the carbon dioxide recovery element 43 is thus forcibly led into the reforming reaction unit 22 of the methanol reformer 20, like the first embodiment. This makes the reforming reaction unit 22 to be filled with carbon dioxide thus fed.

After completion of the replacement of the reforming reaction unit 22 with carbon dioxide, the third pressure pump 50a and the gas pump 41a are inactivated in the same manner as the first embodiment. Completion of the replacement with carbon dioxide is determined by the extinguished flame in the hydrogen burner unit of the recovery element heating burner 44 or the detection of the hydrogen sensor 49. When the variation in electromotive force shows a stop of operation of the fuel cell 30 and completed consumption of hydrogen to allow only carbon dioxide to remain in the fuel cell 30, the valve 37a of the air supply conduit 37 is controlled off to block the passage.

The fuel cell system 10A of the second embodiment has similar effects to those of the fuel cell system 10 of the first embodiment. In the fuel cell system 10A of the second embodiment, only the reforming reaction unit 22 is filled with carbon dioxide released from the zeolite. This lessens the quantity of carbon dioxide required for the replacement and accordingly reduces the amount of zeolite packed in the carbon dioxide recovery element 43. The fuel cell system 10A of the second embodiment makes the carbon dioxide recovery element 43 and thereby the whole carbon dioxide recovery unit 40 sufficiently small and shortens the time for absorbing a required quantity of carbon dioxide.

In the second embodiment, a supply of hydrogen rich gas is fed from the methanol reformer 20 to the recovery element heating burner 44. This structure enhances the efficiency of fuel consumption in the recovery element heating burner 44 and allows quick release of carbon dioxide from the zeolite in the carbon dioxide recovery element 43. This means that the fuel cell system 10A of the second embodiment can complete replacement of the atmosphere in the reforming reaction unit 22 with carbon dioxide within a short time.

Figure 4:
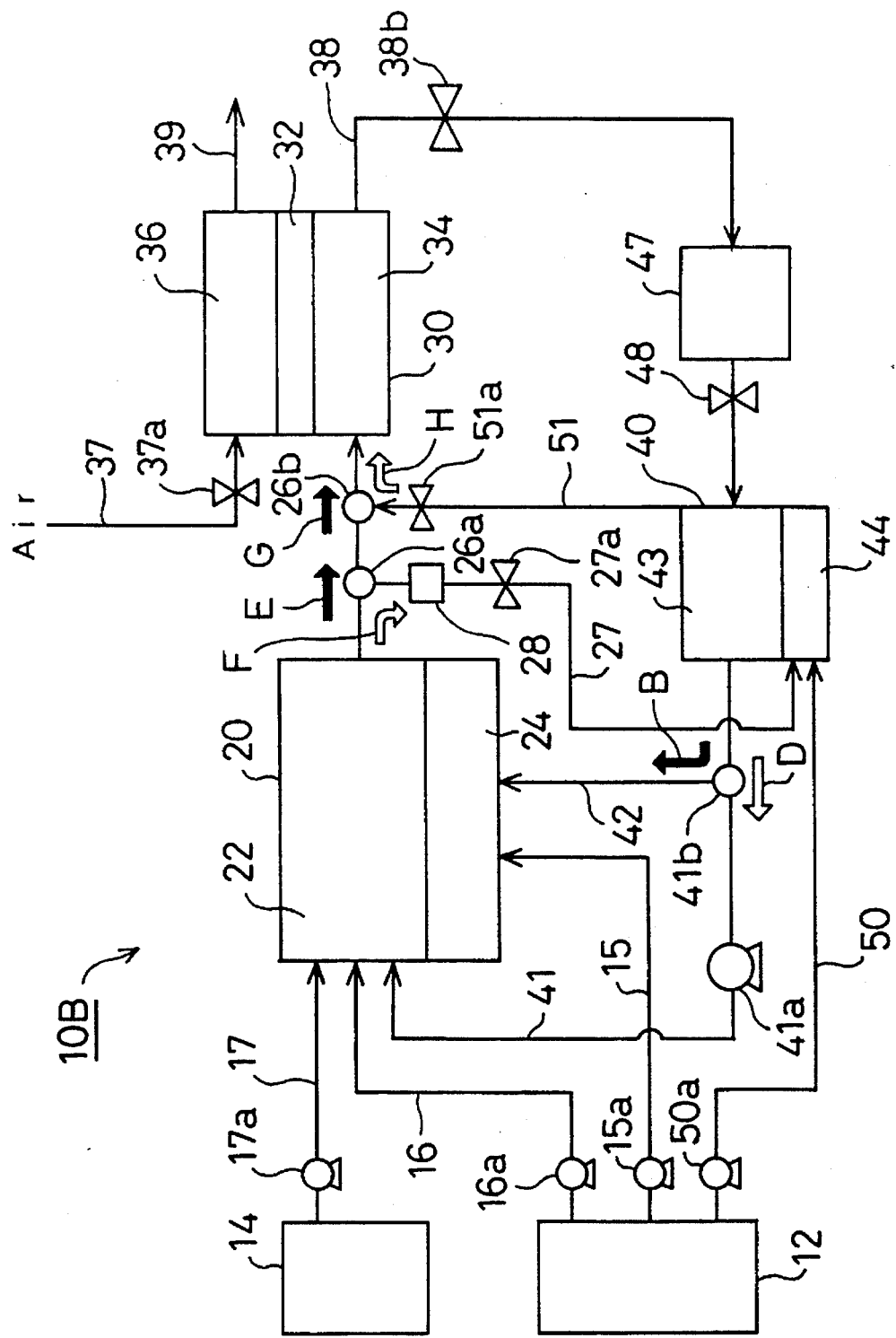
FIG. 4 is a block diagram schematically illustrating structure of a fuel cell system 10B as a third embodiment according to the invention.

FIG. 4 is a block diagram schematically illustrating structure of a fuel cell system 10B as a third embodiment according to the invention. The fuel cell system 10B of the third embodiment has similar structure to that of the fuel cell system 10A of the second embodiment, except separate pathways applied for replacing atmospheres in the reforming reaction unit 22 and the fuel cell 30 with carbon dioxide.

As shown in FIG. 4, the fuel cell system 10B has a second gas substitution conduit 51 connecting the carbon dioxide recovery element 43 of the carbon dioxide recovery unit 40 to the gaseous hydrogen supply conduit 26. A three-way valve 26b is arranged at a junction of the second gas substitution conduit 51 and the gaseous hydrogen supply conduit 26. In the fuel cell system 10B, carbon dioxide from the carbon dioxide recovery element 43 can be fed only to the fuel cell 30 via the second gas substitution conduit 51. The second gas substitution conduit 51 is provided with a valve 51a to allow and block the passage.

The fuel cell system 10B of the third embodiment works in the following manner. During operation of the fuel cell 30, the three-way valve 26b disposed in the gaseous hydrogen supply conduit 26 is switched to block the passage to the second gas substitution conduit 51 and open the gaseous hydrogen supply conduit 26, while the other valves including the three-way valve 26a are controlled in the same manner as the second embodiment. While the fuel cell 30 continues operation, a hydrogen rich gas generated in the methanol reformer 20 is supplied to the fuel cell 30 as shown by the closed arrows E and G in FIG. 4. Carbon dioxide included in the carbon dioxide rich gas discharged from the fuel cell 30 is then absorbed and retained in the zeolite packed in the carbon dioxide recovery element 43 of the carbon dioxide recovery unit 40, during the operation of the fuel cell 30.

When the fuel cell 30 stops operation, the three-way valve 26b is switched to allow a gas flow from the second gas substitution conduit 51 to the gaseous hydrogen supply conduit 26, in addition to the control operation of the related valves and pumps as executed in the fuel cell system 10A of the second embodiment. The valve 51a of the second gas substitution conduit 51 is controlled on to allow the passage, simultaneously with the switching operation of the three-way valve 26b.

Like the fuel cell system 10A of the second embodiment, the structure of the fuel cell system 10B allows the atmosphere in the reforming reaction unit 22 of the methanol reformer 20 to be replaced with carbon dioxide released from the zeolite in the carbon dioxide recovery element 43. A negative pressure generated by the consumption of hydrogen in the anode 34 allows carbon dioxide released from the carbon dioxide recovery element 43 to be sucked into a pathway from the three-way valve 26a via the fuel cell 30 to the exhaust valve 38b, thereby replacing the atmosphere in the fuel cell 30 with carbon dioxide.

After completion of replacement of the atmosphere in the reforming reaction unit 22 and the fuel cell 30 with carbon dioxide, the valve 51a disposed in the second gas substitution conduit 51 is controlled off to block the passage, in addition to the control operation of the related pumps and valves as executed in the fuel cell system 10A of the second embodiment.

The fuel cell system 10B of the third embodiment has similar effects to those of the fuel cell systems 10 and 10A of the first and the second embodiments. The structure of the third embodiment allows replacement of the atmosphere in the fuel cell 30 with carbon dioxide to be executed independently of the reforming reaction unit 22, without any additional pump for introducing carbon dioxide. The fuel cell system 10B of the third embodiment accordingly has a favorably simple structure.

Figure 5:
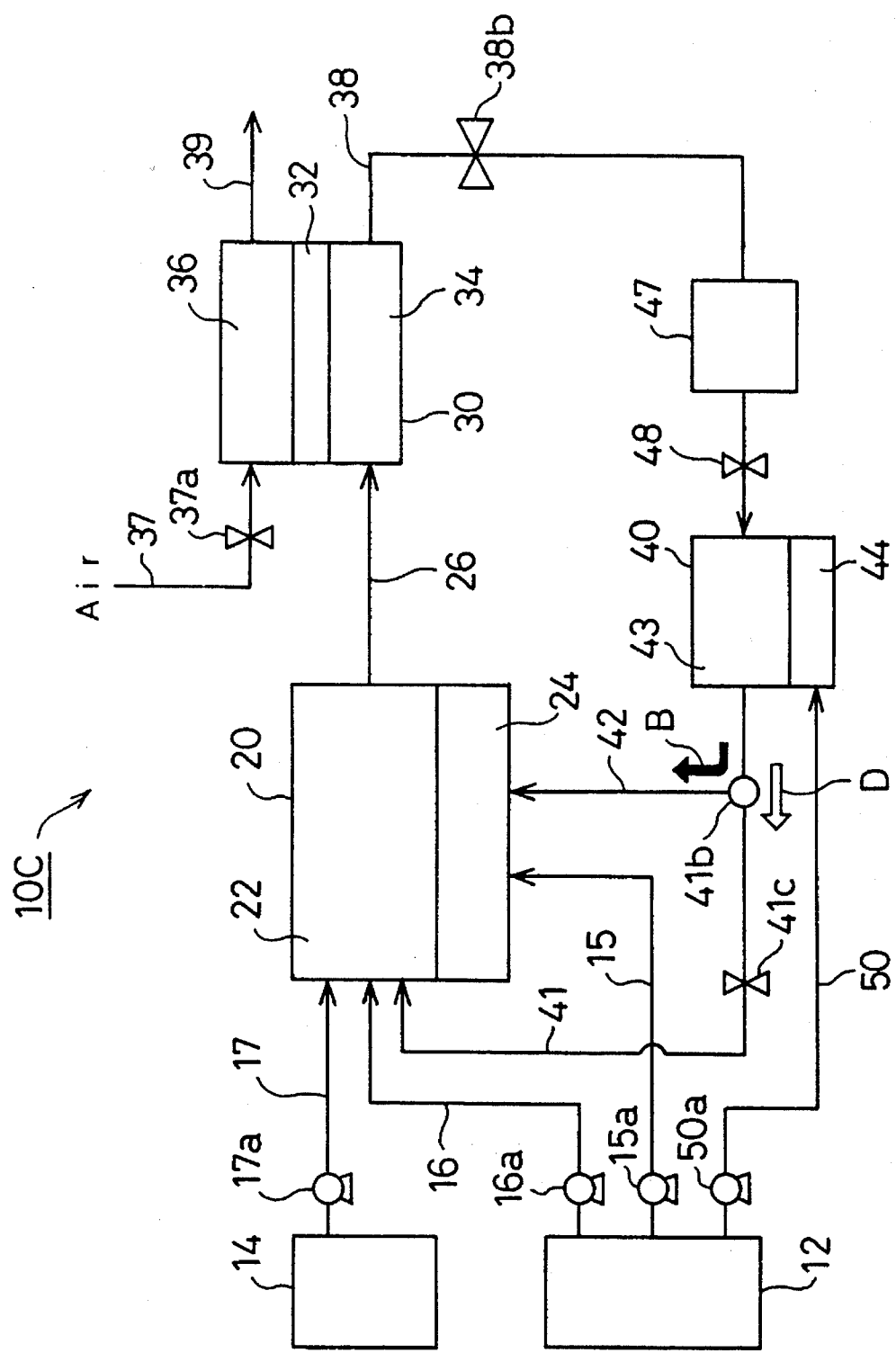
FIG. 5 is a block diagram schematically illustrating structure of a fuel cell system 10C as a fourth embodiment according to the invention.

FIG. 5 is a block diagram schematically illustrating structure of a fuel cell system 10C as a fourth embodiment according to the invention. The fuel cell system 10C has similar structure to that of the fuel cell system 10 of the first embodiment, except that the fuel cell system 10C has a valve 41c to allow and block the passage in place of the gas pump 41a disposed in the gas substitution conduit 41 and omits the pathway for introducing the exhaust gas from the fuel cell 30 to the recovery element heating burner 44. The other valves and pumps are driven and controlled in the similar manner to the fuel cell system 10A of the second embodiment.

While the fuel cell 30 continues operation, the structure of the fuel cell system 10C allows carbon dioxide included in the carbon dioxide rich gas discharged from the fuel cell 30 to be absorbed and retained in the zeolite packed in the carbon dioxide recovery element 43 of the carbon dioxide recovery unit 40. When the fuel cell 30 stops operation, carbon dioxide is released from the zeolite in the carbon dioxide recovery element 43 by application of heat through combustion of methanol in the recovery element heating burner 44. Replacement with carbon dioxide is implemented in the manner mentioned below.

When the fuel cell 30 stops operation, a control device (not shown) controls off the exhaust valve 38b of the first exhaust conduit 38 and the valve 48 to cut the connection with the fuel cell 30 and the carbon dioxide recovery unit 40, while keeping the valve 37a open to maintain the connection with the air supply conduit 37. Under such conditions, the fuel cell 30 continues electrochemical reactions, which consume gaseous hydrogen included in the hydrogen rich gas remaining in the anode 34 and included in the hydrogen rich gas generated as long as residual methanol and water exist in the reforming reaction unit 22. Consumption of hydrogen generates a negative pressure in the fuel cell 30 and allows carbon dioxide to be flown from the carbon dioxide recovery element 43, thereby replacing atmospheres in the reforming reaction unit 22 and the fuel cell 30 with carbon dioxide.

Completion of replacement of the atmosphere in the reforming reaction unit 22 and the fuel cell 30 with carbon dioxide is determined by the variation in electromotive force of the fuel cell 30. On completion of the replacement with carbon dioxide, the valve 41c disposed in the gas substitution conduit 41 is controlled off to block the passage, in addition to the control operation of the related pumps and valves as executed in the fuel cell system 10A of the second embodiment.

The fuel cell system 10C of the fourth embodiment has similar effects to those of the fuel cell systems of the above embodiments. The structure of the fourth embodiment allows atmospheres in the reforming reaction unit 22 and the fuel cell 30 to be replaced with carbon dioxide by means of the negative pressure, without any additional pump for introducing carbon dioxide. The fuel cell system 10C of the fourth embodiment accordingly has a favorably simple structure.

Figure 6:
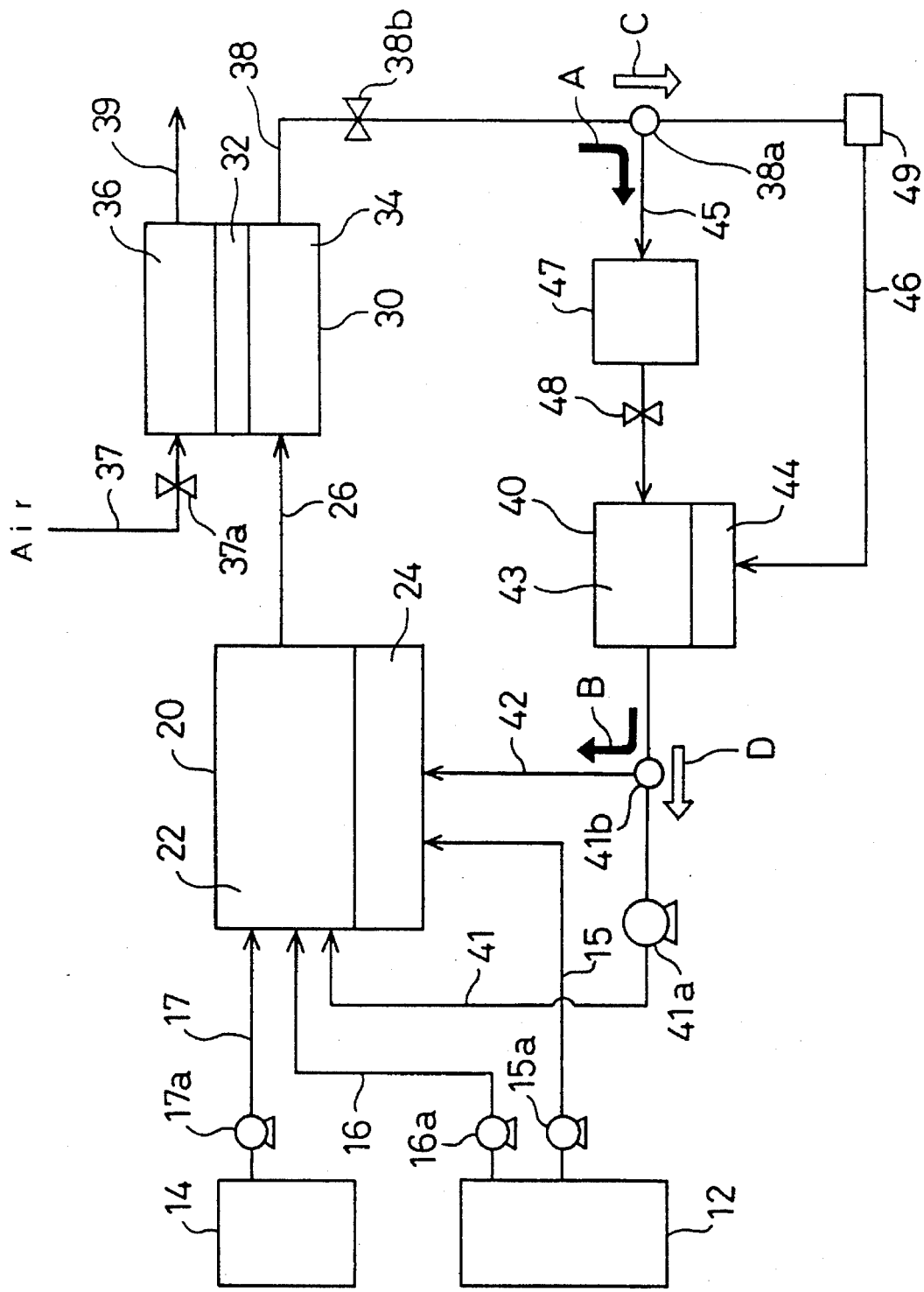
FIG. 6 is a block diagram schematically illustrating structure of a fuel cell system 10D as a fifth embodiment according to the invention.

FIG. 6 is a block diagram schematically illustrating structure of a fuel cell system 10D as a fifth embodiment according to the invention. The fuel cell system 10D has similar structure to that of the fuel cell system 10 of the first embodiment, except that the fuel cell system 10D omits the third methanol supply conduit 50 connecting the methanol reservoir 12 to the recovery element heating burner 44 as well as the third pressure pump 50a disposed in the third methanol supply conduit 50. In the fuel cell system 10D, the recovery element heating burner 44 includes only a hydrogen burner unit, which combusts only gaseous hydrogen included in the exhaust gas fed from the fuel cell 30 through the first exhaust conduit 38 for heating the carbon dioxide recovery element 43. The other valves and pumps are driven and controlled in the similar manner to the fuel cell system 10 of the first embodiment.

When the fuel cell 30 stops operation, the structure of the fuel cell system 10D allows the recovery element heating burner 44 to combust gaseous hydrogen included in the exhaust gas from the fuel cell 30 for heating the carbon dioxide recovery element 43 and accordingly makes carbon dioxide released from the zeolite packed in the carbon dioxide recovery element 43. Replacement of atmospheres in the reforming reaction unit 22 and the fuel cell 30 with the released carbon dioxide is implemented in the same manner as the fuel cell system 10 of the first embodiment.

When the fuel cell 30 stops operation, the recovery element heating burner 44 receives first a supply of carbon dioxide rich gas containing gaseous hydrogen and then a flow of hydrogen rich gas remaining in the anode 34 and hydrogen rich gas generated as long as residual methanol and water exist in the reforming reaction unit 22. With a progress of the replacement with carbon dioxide, carbon dioxide is flown into the recovery element heating burner 44. Combustion of hydrogen in the recovery element heating burner 44 gradually decreases with a progress of the replacement with carbon dioxide and is eventually stopped by the flow of carbon dioxide. Namely release of carbon dioxide from the zeolite by application of heat from the recovery element heating burner 44 is suppressed gradually with a progress of the replacement with carbon dioxide and stopped on completion of the replacement.

The structure of the fuel cell system 10D of the fifth embodiment effectively prevents carbon dioxide from being released unnecessarily from the zeolite in the carbon dioxide recovery element 43 during non-operation of the fuel cell 30. The structure easily detects completion of the replacement with carbon dioxide and does not require any additional pump for feeding the gaseous fuel to the recovery element heating burner 44. The fuel cell system 10D of the fifth embodiment accordingly has a favorably simple structure.

The above embodiments are only illustrative and not restrictive in any sense. There may be many modifications, alterations, and changes without departing from the scope or spirit of essential characteristics of the invention. Some examples of modification are given below.

The structure of the invention is applicable to a Phosphoric Acid Fuel Cell with a phosphate electrolyte and a Molten Carbonate Fuel Cell with an electrolyte plate impregnated with a molten carbonate, other than a Polymer Electrolyte Fuel Cell with a polymer electrolyte membrane. The essential features of the invention are applied not only to fuel cells but to any systems which consume gaseous hydrogen included in a hydrogen rich gas generated by the methanol reformer 20 and discharge carbon dioxide rich gas.

Although methanol is an object of reforming in the above embodiments, the structure of the invention is applicable to other reformers for reforming other hydrocarbons like methane and corresponding fuel cell systems.

Figure 7:
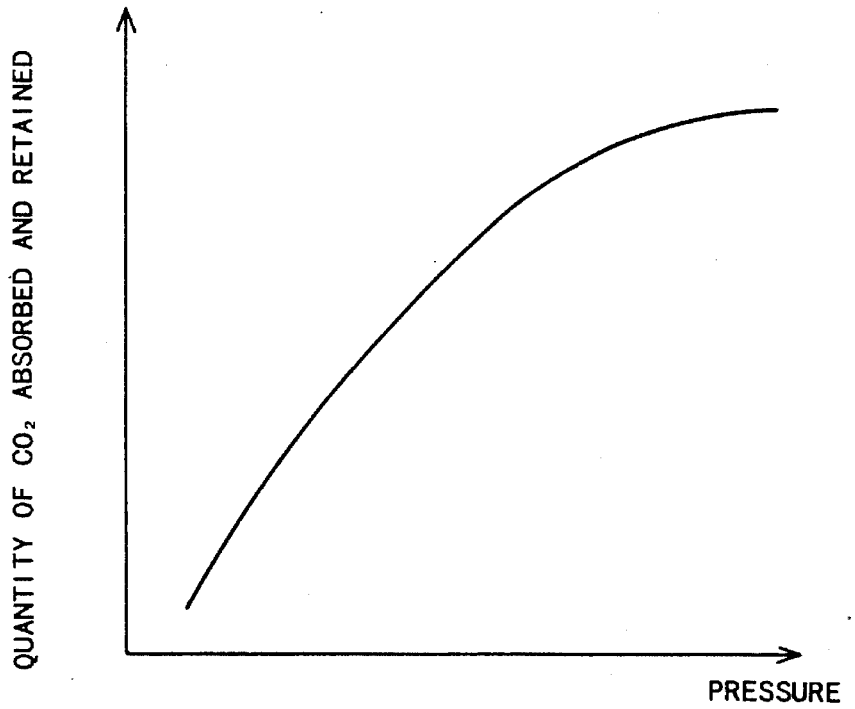
FIG. 7 is a graph, where the $CO_2$-absorbing and retaining ability of zeolite charged in the carbon dioxide recovery unit 43 is plotted against the pressure.

In the above embodiments, the carbon dioxide recovery element 43 is heated for the release of carbon dioxide from the zeolite packed in the carbon dioxide recovery element 43. The quantity of $CO_2$ absorbed and retained in zeolite decreases with a decrease in pressure as shown in the graph of FIG. 7. According to a modified structure, release of carbon dioxide from a zeolite is implemented by reducing the internal pressure of the carbon dioxide recovery element 43 lower than a level at which carbon dioxide is absorbed into the zeolite. In a concrete structure, the valve 48 arranged before the carbon dioxide recovery element 43 is closed and carbon dioxide retained in the carbon dioxide recovery element 43 is sucked by a vacuum pump applied instead of the gas pump 41a. This allows quick release of carbon dioxide and completes replacement of atmospheres in the reforming reaction unit 22 and the fuel cell 30 with carbon dioxide within a short time.

The scope and spirit of the present invention are limited only by the terms of the appended claims.

What is claimed is:

1. A reformer comprising reformer means for reforming hydrocarbon to generate a hydrogen rich gas;

gas feeding means for feeding a carbon dioxide-containing gas;

carbon dioxide absorption means for absorbing and retaining carbon dioxide in said carbon dioxide-containing gas under a first condition and releasing the absorbed and retained carbon dioxide under a second condition;

carbon dioxide release means for keeping said carbon dioxide absorption means under said second condition to release the absorbed and retained carbon dioxide from said carbon dioxide absorption means; and replacement means for supplying the carbon dioxide released by said carbon dioxide release means to said reformer means to replace said hydrocarbon with said carbon dioxide.

2. A reformer in accordance with claim 1, wherein said gas feeding means comprises:

gaseous hydrogen consumption means for consuming gaseous hydrogen included in the hydrogen rich gas generated by said reformer means and discharging a carbon dioxide rich gas; and, means for feeding the carbon dioxide rich gas discharged from s aid gaseous hydrogen consumption means to said carbon dioxide absorption means.

3. A reformer in accordance with claim 2, wherein said gaseous hydrogen consumption means comprises a fuel cell for consuming, as a gaseous fuel, gaseous hydrogen included in the hydrogen rich gas generated by said reformer means of said reformer and discharging a carbon dioxide rich gas.

4. A reformer in accordance with claim 3, wherein said gas feeding means further comprises water content removal means for removing a water content in carbon dioxide rich gas discharged from said fuel cell and feeding the water-removed gas to said carbon dioxide absorption means.

5. A reformer in accordance with claim 1, wherein said reformer means comprises gas generating means for receiving a supply of methanol and reforming the supplied methanol to generate a hydrogen rich gas.

6. A reformer in accordance with claim 1, wherein said reformer means further comprises gas generating means for receiving a supply of methane and reforming the supplied methane to generate a hydrogen rich gas.

7. A reformer in accordance with claim 1, wherein said carbon dioxide absorption means comprises an absorption element packed with a zeolite for absorbing and retaining carbon dioxide; and said carbon dioxide release means comprises environment varying means for keeping said absorption element under a heating condition as said second condition.

8. A reformer in accordance with claim 1, wherein said carbon dioxide absorption means comprises an absorption element packed with a zeolite for absorbing and retaining carbon dioxide; and said carbon dioxide release means comprises environment varying means for keeping said absorption element under a low pressure condition as said predetermined second condition.

9. A reformer in accordance with claim 1, further comprising supply means for supplying hydrocarbon to the reformer means, wherein said replacement means further stops the supply of hydrocarbon by said supply means.

10. A fuel cell system comprising a reformer having reformer means for reforming hydrocarbon to generate a hydrogen rich gas, and a fuel cell for consuming, as a gaseous fuel, gaseous hydrogen included in the hydrogen rich gas generated by said reformer means of said reformer;

gas feeding means for feeding a carbon dioxide rich gas discharged from said fuel cell;

absorption means packed with a carbon dioxide absorbent for absorbing and retaining carbon dioxide in said carbon dioxide rich gas at a first temperature and releasing the absorbed and retained carbon dioxide at a second temperature which is higher than said first temperature;

heating means for heating said absorption means at least to said second temperature at least during a non-operation state of said fuel cell, to release the carbon dioxide from said carbon dioxide absorbent packed; and replacement means for supplying the carbon dioxide released from said absorption means to at least one of said reformer means to replace said hydrocarbon with said carbon dioxide and said fuel cell to replace said hydrogen rich gas with said carbon dioxide.

11. A fuel cell system in accordance with claim 10, wherein said heating means comprises combustion means for receiving a supply of the carbon dioxide rich gas containing residual hydrogen and discharged from said fuel cell and for combusting the residual hydrogen included in said carbon dioxide rich gas.

12. A fuel cell system in accordance with claim 10, wherein said heating means comprises combustion means for receiving a supply of the hydrogen rich gas generated by said reformer means after a stop of supply of said hydrocarbon and for combusting hydrogen included in said hydrogen rich gas.

13. A fuel cell system in accordance with claim 10, wherein said carbon dioxide absorbent comprises a zeolite for absorbing and retaining carbon dioxide.

14. A fuel cell system in accordance with claim 10, wherein said replacement means supplies the carbon dioxide released from said absorption means to said reformer means and said fuel cell.

15. A fuel cell system in accordance with claim 10, said fuel cell system further comprising:

reformer heating means for combusting hydrogen to apply heat to said reformer means and adjust a reforming condition in said reformer; and gas introducing means for introducing the carbon dioxide rich gas containing residual hydrogen, which is discharged from said fuel cell and passes through said absorption means, to said reformer heating means, while said heating means is under a non-activating condition.

16. A fuel cell system in accordance with claim 10, wherein said gas feeding means further comprises water content removal means for removing a water content in the carbon dioxide rich gas discharged from said fuel cell and feeding the water-removed gas to said absorption means.

17. A fuel cell system in accordance with claim 10, wherein said fuel cell is one selected among the group consisting of a polymer electrolyte fuel cell with a polymer electrolyte membrane, a phosphoric acid fuel cell with a phosphate electrolyte, and a molten carbonate fuel cell with an electrolyte plate impregnated with a molten carbonate.

18. A fuel cell system in accordance with claim 11, said fuel cell system further comprising:

replacement detecting means for detecting at least one of completion of replacing said hydrocarbon with said carbon dioxide supplied by said replacement means in said reformer means and completion of replacing said hydrogen rich gas with said carbon dioxide by said replacement means in said fuel cell; and disconnecting means for, when said replacement detecting means detects completion of the replacement with carbon dioxide, blocking a pathway for discharging the carbon dioxide rich gas from said fuel cell.

19. A fuel cell system in accordance with claim 18, wherein said replacement detecting means comprises flame extinction detecting means for detecting extinction of flame in said combustion means.

20. A fuel cell system comprising a reformer having reformer means for reforming hydrocarbon to generate a hydrogen rich gas, a fuel cell for consuming, as a gaseous fuel, gaseous hydrogen included in the hydrogen rich gas generated by said reformer means of said reformer;

gas feeding means for feeding a carbon dioxide rich gas discharged from said fuel cell;

absorption means packed with a carbon dioxide absorbent for absorbing and retaining carbon dioxide in said carbon dioxide rich gas at a first pressure and releasing the absorbed and retained carbon dioxide at a second pressure which is lower than said first pressure;

pressure reduction means for reducing pressure in said absorption means to at most said second pressure at least during a non-operation state of said fuel cell, to release the carbon dioxide from said carbon dioxide absorbent packed in said absorption means; and replacement means for supplying the carbon dioxide released from said absorption means to at least one of said reformer means to replace said hydrocarbon with said carbon dioxide and said fuel cell to replace said hydrogen rich gas with said carbon dioxide.

21. A fuel cell system in accordance with claim 20, wherein said carbon dioxide absorbent of said absorption means comprises a zeolite for absorbing and retaining carbon dioxide.

* * * * *